(12) United States Patent
Popoviciu et al.

(10) Patent No.: US 8,862,095 B2
(45) Date of Patent: Oct. 14, 2014

(54) MANAGING MOBILE NODES IN A LAWFUL INTERCEPT ARCHITECTURE

(75) Inventors: Ciprian P. Popoviciu, Raleigh, NC (US); Mohamed Khalid, Cary, NC (US); John M. Gavin, Raleigh, NC (US); William J. Wei, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1240 days.

(21) Appl. No.: 11/765,094

(22) Filed: Jun. 19, 2007

(65) Prior Publication Data

US 2008/0317019 A1 Dec. 25, 2008

(51) Int. Cl.

| | |
|---|---|
| *H04M 3/16* | (2006.01) |
| *H04W 4/00* | (2009.01) |
| *H04L 29/06* | (2006.01) |
| *H04L 12/26* | (2006.01) |
| *H04M 3/22* | (2006.01) |
| *H04W 12/02* | (2009.01) |
| *H04M 7/00* | (2006.01) |
| *H04L 12/24* | (2006.01) |
| *H04W 88/00* | (2009.01) |
| *H04W 80/04* | (2009.01) |

(52) U.S. Cl.
CPC ......... *H04L 12/2602* (2013.01); *H04M 7/0078* (2013.01); *H04L 41/0213* (2013.01); *H04L 63/06* (2013.01); *H04L 43/00* (2013.01); *H04L 63/30* (2013.01); *H04W 88/005* (2013.01); *H04M 3/2281* (2013.01); *H04W 80/04* (2013.01); *H04W 12/02* (2013.01)
USPC ..... 455/410; 455/414.1; 455/433; 455/435.1; 370/338

(58) Field of Classification Search
CPC ......... H04W 12/02; H04L 6/06; H04M 3/223
USPC ............... 370/312, 389, 338; 455/410, 412.1, 455/414.1, 433, 435.1
See application file for complete search history.

(56) References Cited

U.S. PATENT DOCUMENTS 6,400,813 B1 * 6/2002 Birnhak ...................... 379/133
6,412,007 B1 6/2002 Bui et al.

(Continued)

FOREIGN PATENT DOCUMENTS

| CN | 1277771 A | 12/2000 |
|---|---|---|
| CN | 1706159 A | 12/2005 |

(Continued)

OTHER PUBLICATIONS

F. Baker, Cisco Lawful Intercept Control MIB, draft-baker-slem-mib-00, Internet-Draft, Apr. 2003, pp. 1-38.

(Continued)

*Primary Examiner* — George Eng
*Assistant Examiner* — Joseph Dean, Jr.
(74) *Attorney, Agent, or Firm* — Brinks Gilson & Lione

(57) ABSTRACT

In an embodiment, a care-of address associated with a first node coupled to a communications network via an access node is received. The care-of address may be contained in a notification message sent by a home agent associated with the first node or by a binding update message sent by the first agent. The access node is identified using the care-of address. A request to tap communications associated with the first node at the access node is generated and the request is forwarded to the access node to cause communications associated with the first node to be tapped at the access node.

21 Claims, 11 Drawing Sheets

(56) References Cited

U.S. PATENT DOCUMENTS

| | | | |
|---|---|---|---|
| 6,412,077 | B1 | 6/2002 | Roden et al. |
| 6,442,608 | B1 | 8/2002 | Knight et al. |
| 6,470,453 | B1 | 10/2002 | Vilhuber |
| 6,571,287 | B1 | 5/2003 | Knight et al. |
| 6,654,589 | B1 * | 11/2003 | Haumont .................... 455/67.11 |
| 6,715,082 | B1 | 3/2004 | Chang et al. |
| 6,748,543 | B1 | 6/2004 | Vilhuber |
| 6,894,994 | B1 * | 5/2005 | Grob et al. .................... 370/335 |
| 6,952,781 | B1 | 10/2005 | Chang et al. |
| 7,028,073 | B1 | 4/2006 | Bui et al. |
| 7,046,663 | B1 | 5/2006 | Temoshenko |
| 7,113,504 | B1 | 9/2006 | Volftsun et al. |
| 7,136,359 | B1 | 11/2006 | Coile et al. |
| 7,136,373 | B2 | 11/2006 | Ma |
| 7,161,947 | B1 | 1/2007 | Desai |
| 7,225,270 | B2 | 5/2007 | Barr et al. |
| 2005/0027866 | A1 * | 2/2005 | Seurujarvi et al. ............ 709/227 |
| 2005/0114543 | A1 | 5/2005 | Popovich |
| 2006/0062214 | A1 * | 3/2006 | Ng et al. ....................... 370/389 |

FOREIGN PATENT DOCUMENTS

| | | |
|---|---|---|
| WO | WO 99/17499 | 4/1999 |
| WO | WO 2003/055249 A1 | 7/2003 |
| WO | WO 2004/010649 A1 | 1/2004 |

OTHER PUBLICATIONS

C. Perkins, et al., Route Optimization in Mobile IP, draft-ietf-mobileip-optim-11.txt, Internet-Draft, Sep. 6 2001, pp. i-25.

Cisco 7600 Lawful Intercept Configuration Guide, Cisco IOS Software Release 12.2SRB, Cisco Systems, Inc., Feb. 2007, pp. i to IN-2.

D. Ghosh, Mobile IP, downloaded Jun. 18, 2007 from the Internet, pp. 1-12.

J. Postel, Internet Protocol, Request for Comments (RFC) 791, Information Sciences Institute, University of Southern California, DARPA Internet Program, Protocol Specification, Internet Engineering Task Force (IETF), Sep. 1981, pp. 1-45.

S. Deering, et al., Internet Protocol, Version 6 (IPv6) Specification, RFC 2460, IETF, Dec. 1998, pp. 1-39.

C. Perkins, IP Mobility Support for IPv4, RFC 3344, IETF, Aug. 2002, pp. 1-99.

J. Manner, et al., Mobility Related Terminology, RFC 3753, IETF, Jun. 2004, pp. 1-36.

D. Johnson, et al., Mobility Support in IPv6, RFC 3775, IETF, Jun. 2004, pp. 1-165.

J. Arkko, et al., Using IPsec to Protect Mobile IPv6 Signaling Between Mobile Nodes and Home Agents, RFC 3776, IETF, Jun. 2004, pp. 1-40.

F. Baker, et al., Cisco Architecture for Lawful Intercept in IP Networks, RFC 3924, IETF, Oct. 2004, pp. 1-18.

P. Nikander, et al., Mobile IP version 6 (MIPv6) Route Optimization Security Design, Proceedings of the Institute of Electrical and Electronics Engineers (IEEE), Vehicular Technology Conference Fall 2003, Orlando, FL USA, Oct. 2003, IEEE Press, pp. 1-5.

Chinese Office Action for corresponding Chinese Application No. 200880020856.8 issued Apr. 6, 2012 including translation.

International Search Report and Written Opinion for PCT/US2008/066810 mailed Apr. 24, 2009.

Andres Rojas et al., "Lawful Interception for Mobile IP Networks—a Mobile Agent Approach", Australian Telecommunications Networks & Applications Conference 2004 (ATNAC2004), Sydney, Australia, Dec. 8-10, 2004, pp. 445-448.

Andres Rojas et al., "Efficient Lawful Interception in Mobile IPv6 Networks", Australian Telecommunications Networks & Applications Conference (ATNAC), Sydney, Australia, Dec. 31, 2006, pp. 1-5.

* cited by examiner

MANAGING MOBILE NODES IN A LAWFUL INTERCEPT ARCHITECTURE

BACKGROUND

A communications network is a geographically distributed collection of interconnected communication links used to transport data between nodes, such as routers, switches, computer systems and so on. Many types of communications networks exist, with types ranging from local area networks (LANs) to wide-area networks (WANs). The nodes typically communicate by exchanging discrete messages of data (e.g., data packets) according to pre-defined protocols.

Many users gain access to a communications network, such as the Internet, through a Service Provider (SP). Here, a user may enter into a subscription to subscribe to the SP's services. The services may include provisions for allowing subscribers to gain access the network using end nodes (e.g., a computer systems operated by the subscribers). After gaining access to the network, a subscriber may exchange information, such as electronic mail (e-mail), text, graphics, images, web pages, files and so on, with other subscribers that also have access to the network.

BRIEF DESCRIPTION OF THE DRAWINGS

The foregoing and other objects, features and advantages of the techniques described herein will be apparent from the following more particular description of techniques described herein, as illustrated in the accompanying drawings in which like reference characters refer to the same parts throughout the different views. The drawings are not necessarily to scale, with emphasis instead being placed upon illustrating principles and concepts of techniques described herein.

DETAILED DESCRIPTION

Overview

Figure 1:
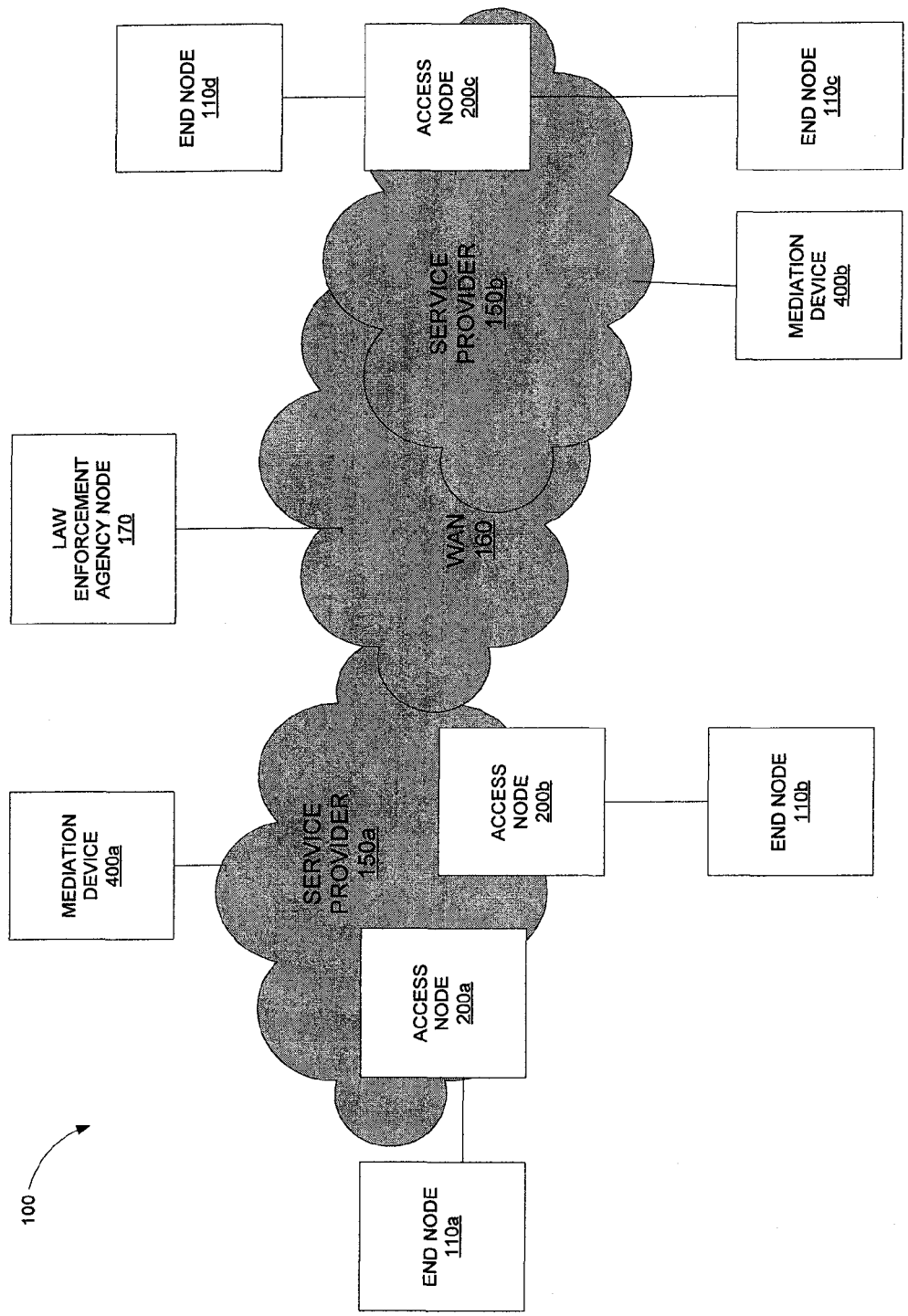
FIG. 1 is a block diagram of a communications network that may be used with techniques described herein.

A service provider (SP) that provides mobility services to its subscribers may assign a home address to an end node associated with a subscriber which may be used by correspondent nodes in the network to forward messages (e.g., data packets) to the subscriber's end node. The home address is usually a permanent address that identifies the end node regardless of its location. The end node may be associated with a home agent. The home agent is typically an access node in the network that the end node normally uses to gain access to the network. Messages destined for the end node are often routed to the end node's home agent which forwards the messages to the end node.

In some cases an end node may be mobile and gain access to the network at a point of attachment other than the end node's home agent. Here, the end node may be assigned a care-of address that may be used instead of the end node's home address to forward messages to the end node.

An end node may register its care-of address with its home agent to cause the home agent to forward messages to the end node using its care-of address instead of its home address. In a typical arrangement, messages that are addressed to the end node using its home address are received by the home agent. The home agent uses the care-of address to forward the messages from the home agent to the end node. The messages may be forwarded from the home agent to the end node using well-known tunneling techniques.

In addition to providing services to subscribers, an SP may also provide various services to Law Enforcement Agencies (LEAs) in order to accommodate law enforcement. These services may include the Lawful Intercept (LI) of communications transferred to and from end nodes utilized by subscribers that are under lawful surveillance. In some LI arrangements, an SP may configure a mediation device to administer the tapping of the communications. When a subscriber under surveillance accesses the network using an end node, the mediation device directs the home agent associated with the end node to establish a tap of communications to and from the end node. The tap causes the home agent to make a copy of the communications and forward the copy to the mediation device. The mediation device, in turn, forwards the copy of the communications to the LEA. In some cases, the mediation device may format the copy of the communications into a special format requested by the LEA prior to forwarding it to the LEA.

Some networks incorporate route optimization techniques that are used to optimize the forwarding of information to nodes in the networks. For example, mobile Internet Protocol Version 6 (IPv6) networks typically include a route optimization technique that allows information to be forwarded to an end node using the end node's care-of address instead of its home address. This allows information to be forwarded directly to the end node rather than first to the mobile node's home agent then from the home agent to the mobile node.

One problem with the above-described routing optimization is that if a tap is set at an end node's home agent to tap communications associated with the end node and the home agent is bypassed due to route optimization, it is possible information transferred to and from the end node may not be tapped. In other words, due to route optimization, the communications associated with the end node may bypass the home agent altogether and thereby not be replicated and forwarded to a mediation device for transfer to a law enforcement agency (LEA).

Techniques described herein significantly overcome such deficiencies by allowing a tap to be placed at a point of access for an end node even if the end node is not connected to a network via its home agent. In an embodiment, a care-of address associated with a first node coupled to a communications network via an access node is received. The care-of address may be received, for example, from a notification message sent by a home agent associated with the first node or, for example, by a binding update message sent by the first agent. The access node is identified using the received care-of address. A request to tap communications associated with the first node at the access node is generated and the request is forwarded to the access node to cause communications associated with the first node to be tapped at the access node.

Description

Protocols and architectures that may be used with techniques described herein may include the Internet Protocol Version 4 (IPv4), Internet Protocol Version 6 (IPv6), Mobility Support in IPv6 and Cisco Architecture for Lawful Intercept in IP Networks. A description of IPv4 may be found in "Internet Protocol", Request For Comments (RFC) 791, September 1981, which is available from the Internet Engineering Task Force (IETF). A description of IPv6 may be found in S. Deering, et al, "Internet Protocol, Version 6 (IPv6)", RFC 2460, December 1998, which is available from the IETF. A description of Mobility Support in IPv6 may be found in D. Johnson, et al., "Mobility Support in IPv6", RFC 3775, June 2004, which is available from the IETF. A description of Cisco Architecture for Lawful Intercept in IP Networks may be found in F. Baker, et al., RFC 3924, October 2004, which is available from the IETF. It should be noted that other protocols and architectures may be used with techniques described herein.

FIG. 1 is a block diagram of a communications network 100 that may be used with techniques described herein. Network 100 comprises a collection of nodes including end nodes 110, access nodes 200, mediation devices 400 and law enforcement agency (LEA) node 170. These internetworked nodes communicate by exchanging information (e.g., data packets) according to a pre-defined set of network protocols and mechanisms, such as the Transmission Control Protocol/Internet Protocol (TCP/IP), IPv4, IPv6 and so on. A protocol as used herein relates to a set of rules defining how nodes in a communications network interact with each other. It should be noted that communications network 100 is an example of a communications network that may be used with techniques described herein. Techniques described herein may also be used with other communications networks of varying types and complexities.

The end nodes 110 are coupled to service provider (SP) networks 150 via access nodes 200 which, as will be described further below, may be configured to provide the end nodes 110 access to the SP networks 150. Each SP network 150 includes one or more access nodes 200 and a mediation device 400. The SP networks 150 may include additional nodes (not shown), such as routers, switches and so on, that are configured to implement an SP network. The SP networks 150 are coupled to each other via a wide-area network 160, such as the Internet. WAN 160 may comprise various internetworked nodes (not shown), such as routers, switches and so on, that are configured to transfer information (e.g., data packets) between the SP networks 150.

The end nodes 110 may be computer-based systems, such as personal computers (PCs), workstations, Personal Digital Assistants (PDAs) and so on, that are configured to generate information that is carried on network 100. The LEA node 170 is a node (e.g., a server) associated with an LEA and is configured to, inter alia, receive a copy of tapped communications from mediation device 400a.

The access nodes 200 may be routers that are configured to provide the end nodes 110 access to the SP networks 150. An example of a router that may be used with techniques described herein is the Cisco 7600 Series router available from Cisco Systems Incorporated, San Jose, Calif.

Figure 2:
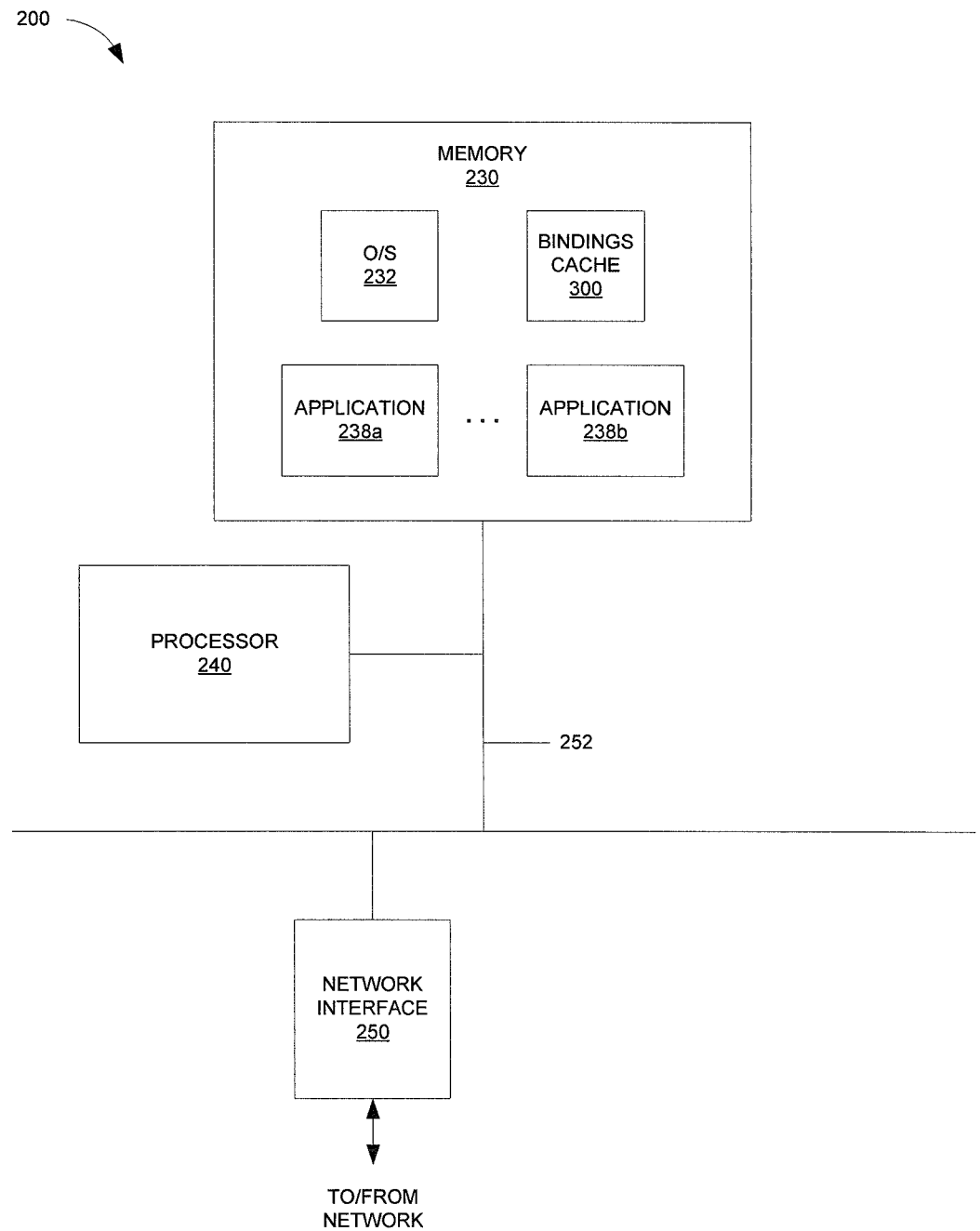
FIG. 2 is a partial block diagram of an example of an access node that may be used with techniques described herein.

FIG. 2 is a partial block diagram of an example of an access node 200 that may be used with techniques described herein. Node 200 comprises a memory 230, a processor 240 and a network interface 250 coupled via a bus 252. The processor 240 may be a central processing unit (CPU) comprising processing circuitry for executing instructions and manipulating data contained in memory 230. These instructions and data may include instructions and data that implement aspects of techniques described herein. Bus 252 is a point-to-point interconnect bus configured to couple various entities contained in node 200 including the processor 240, memory 230 and network interface 250, and enable data and signals to be transferred between these entities.

Network interface 250 is configured to connect (interface) node 200 with network 100 and enable information (e.g., data packets) to be transferred between node 200 and other nodes in network 100 using, e.g., various protocols, such as Ethernet, TCP/IP and so on. To that end, network interface 250 comprises interface circuitry that incorporates the signal, electrical and mechanical characteristics and interchange circuits needed to interface with the network 100 and protocols running over the network 100.

Memory 230 is illustratively a computer-readable medium implemented as a random access memory (RAM) data storage comprising RAM devices, such as dynamic RAM (DRAM) devices. Memory 230 may be configured to hold various software and data structures including operating system (OS) 232, bindings cache 300 and one or more applications 238. It should be noted that memory 230 may contain other information, such as routing and forwarding databases and so on, that are used by node 200 to process e.g., data packets handled by node 200.

The applications 238 are software executed by the processor 240 under control of the OS 232. The applications 238 comprise computer-executable instructions and data that may include computer-executable instructions and data that implement aspects of techniques described herein. OS 232 executes on the processor 240 and comprises computer-executable instructions and data that implement various operating system functions, such as scheduling the applications 238 for execution on the processor 240. Moreover, OS 232 may contain computer-executable instructions and data that implement aspects of techniques described herein.

Figure 3:
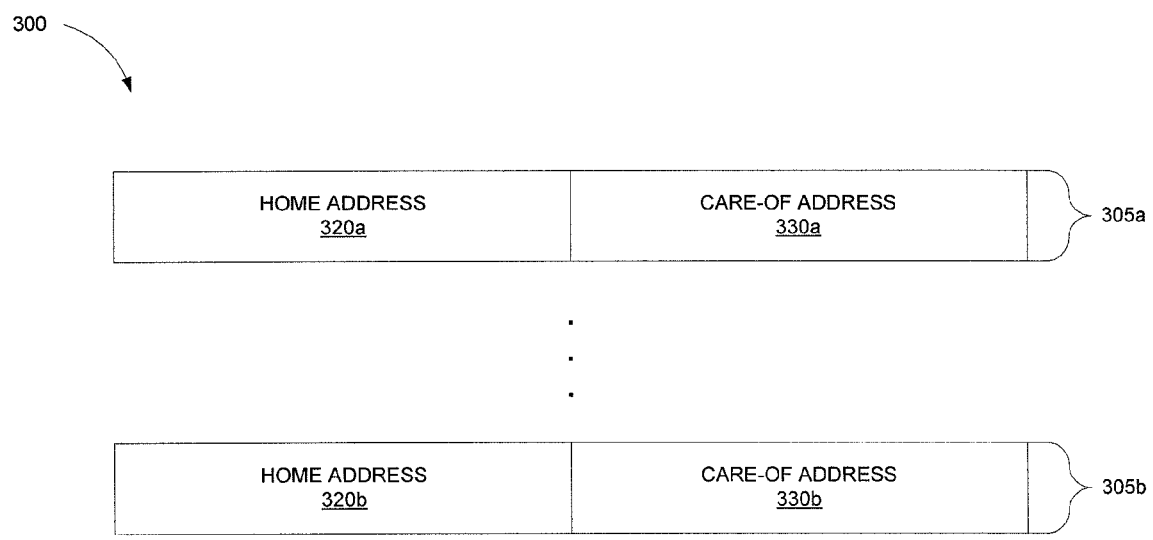
FIG. 3 is a block diagram of a bindings cache that may be used with techniques described herein.

Bindings cache 300 is a data structure that is illustratively configured to hold reachability information (e.g., addresses) associated with end nodes 110 for which the access node 200 is a home agent. FIG. 3 is a block diagram of a bindings cache 300 that may be used with techniques described herein. Cache 300 is illustratively organized as a table comprising one or more entries 305 wherein each entry 305 is associated with an end node 110 and contains a home address field 320 and a care-of address field 330. Each entry 305 is illustratively configured to "bind" (map) a particular home address with a care-of address for an end node 110. As will be described further below, the cache 300 may be used to identify a home address associated with a particular end node 110 using the node's care-of address and vice-versa. In an embodiment, the cache 300 is populated from information contained in messages (e.g., binding update messages) received by the access node 200 from the end nodes 110.

The home address field 320 holds information that represents a home address associated with the end node 110. The home address may be a permanent address (e.g., an IP address) that is assigned to the end node 110. This address may be assigned by a home agent associated with the end node 110. The care-of address field 330 holds information that represents a care-of address associated with the end node 110. The care-of address may be a temporary address (e.g., an IP address) that is assigned to an end node 110 at its current point of attachment to the network 100. This address may be assigned by an access node 200 through which an end node 110 gains access to the network 100.

Figure 4:
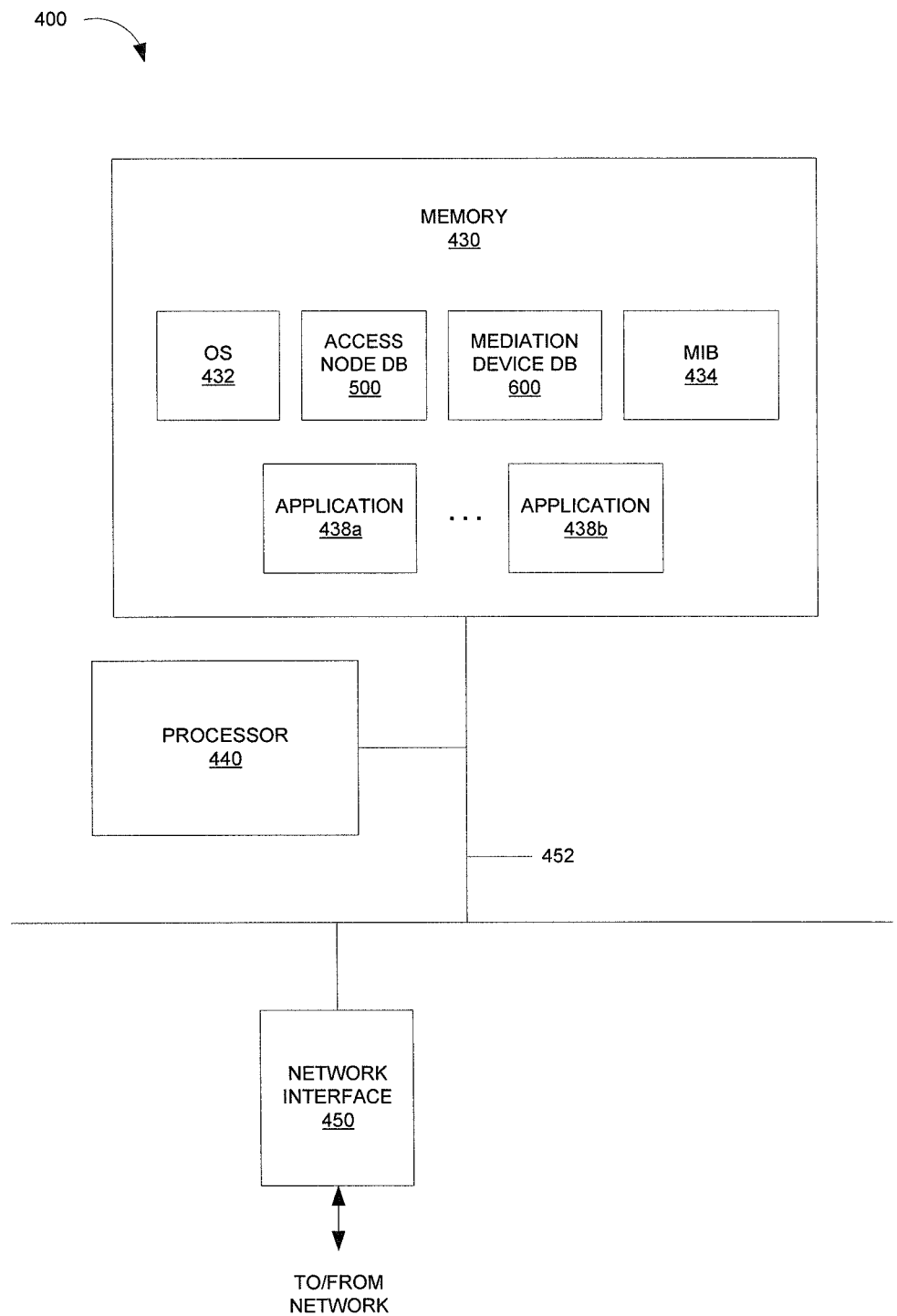
FIG. 4 is a partial block diagram of a mediation device that may be used with techniques described herein.

FIG. 4 is a partial block diagram of a mediation device 400 that may be used with the techniques described herein. In network 100, mediation devices 400 are network nodes that are illustratively configured to perform various functions related to the lawful intercept of communications associated with end nodes 110. These functions may include setting up and provisioning the lawful intercept of communications associated with various end nodes 110 and forwarding a copy of intercepted communications to the LEA node 170. Mediation device 400 comprises a memory 430, a processor 440 and a network interface 450 coupled via a bus 452. Mediation device 400 may be a router, such as a Cisco 7600 series router which is available from Cisco Systems Incorporated, a workstation, a personal computer, a server and so on.

The processor 440 may be a CPU comprising processing circuitry for executing instructions and manipulating data contained in memory 430. These instructions and data may include instructions and data that implement aspects of techniques described herein. Bus 452 is a point-to-point interconnect bus configured to couple various entities contained in node 400 including the processor 440, memory 430 and network interface 450, and enable data and signals to be transferred between these entities.

Network interface 450 is configured to connect (interface) node 400 with network 100 and enable information to be transferred between node 400 and other nodes in network 100 using, e.g., various protocols, such as Ethernet, TCP/IP and so on. To that end, network interface 450 comprises interface circuitry that incorporates the signal, electrical and mechanical characteristics and interchange circuits needed to interface with the network 100 and protocols running over the network 100.

Memory 430 may be a computer-readable medium implemented as a RAM data storage comprising RAM devices, such as DRAM devices. Memory 430 is illustratively configured to hold various software and data structures including operating system (OS) 432, access node database 500, mediation device DB 600, management information base (MIB) 434 and one or more processes 438. It should be noted that memory 430 may contain other information, such as routing databases and so on, that are used by node 400 to process, e.g., packets handled by node 400.

The applications 438 are software applications that execute on the processor 440 under control of the OS 432. The applications 438 contain computer-executable instructions and data that may include computer-executable instructions and data that implement aspects of techniques described herein. OS 432 executes on the processor 440 and comprises computer-executable instructions and data that implement various operating system functions, such as scheduling applications 438 for execution on processor 440. Moreover, OS 432 may contain computer-executable instructions and data that implement aspects of techniques described herein.

MIB 434 is a MIB that may be used by mediation device 400 to direct an access node 200 to tap communications associated with an end node 110. Examples of MIBs that may be used to establish a tap at an access node 200 include the LI MIB described in F. Baker, "Cisco Lawful Intercept Control MIB", Internet Draft draft-baker-slem-mib-00.txt, April 2003 which is available from the IETF and, the CISCO-TAP2-MIB in conjunction with the CISCO-IP-TAP-MIB, both of which are available from Cisco Systems Incorporated.

In network 100, an access node 200 may be directed to establish a tap of communications associated with a particular end node 110 by (1) initializing MIB 434 to identify end node 110, (2) generating a message containing MIB 434 and (3) forwarding the message to the access node 200. The access node 200 receives the message and processes it including (1) recognizing from the MIB 434 contained therein that a tap is to be established to tap communications associated with end node 110 and (2) establishing the tap.

Access node DB 500 is a data structure configured to hold information associated with one or more access nodes 200 contained in network 100 that are within the control of the mediation device 400. Illustratively, an access node 200 is considered to be within control of a mediation device 400 if the mediation device 400 can direct the access node 200 to establish a tap of communications of an end node 110 associated with the access node 200 at the access node 200. An end node 110 is illustratively associated with an access node 200 if, for example, the end node 110 is connected to the network 100 via the access node 200 or the access node 200 is a home agent for the end node 110.

Figure 5:
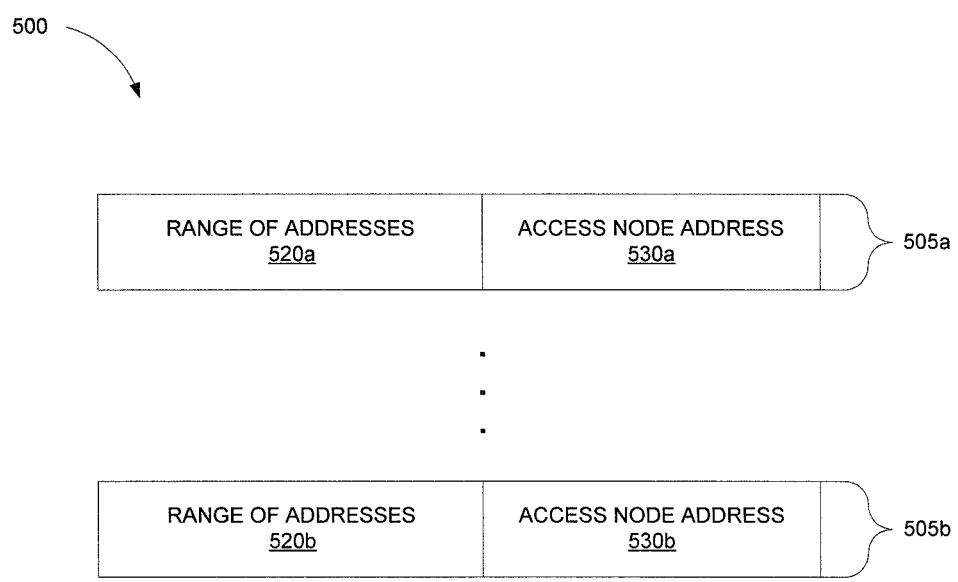
FIG. 5 is a block diagram of an access node database (DB) that may be used with techniques described herein.

FIG. 5 is a block diagram of an access node DB 500 that may be used with techniques described herein. DB 500 is illustratively organized as a table comprising one or more entries 505 wherein each entry 505 is associated with an access node 200 within control of the mediation device 400. Each entry 505 comprises a range-of-addresses field 520 and an access node address field 530. The information contained in DB 500 may be preconfigured by, for example, a user that has access to mediation device 400.

The access node address field 530 holds information that represents an address (e.g., an IP address) that may be used to forward messages to the access node 200. The range-of-addresses field 520 holds information that represents a range of addresses that may be assigned to end nodes 110 that are associated with the access node 200. For example, the access node 200 may be a home agent for a particular end node 110 and the range of addresses may include a home address assigned to the end node 110. Likewise, for example, the access node 200 may an access node 200 other than an end node's home agent that is used by the end node 110 to gain access to the network 100 and the range of addresses may include a care-of address that is assigned to the end node 110.

Mediation device DB 600 is a data structure configured to hold reachability information associated with mediation devices 400. This reachability information may include addresses (e.g., IP addresses) associated with mediation devices 400 that may be used to address messages to the devices 400.

Figure 6:
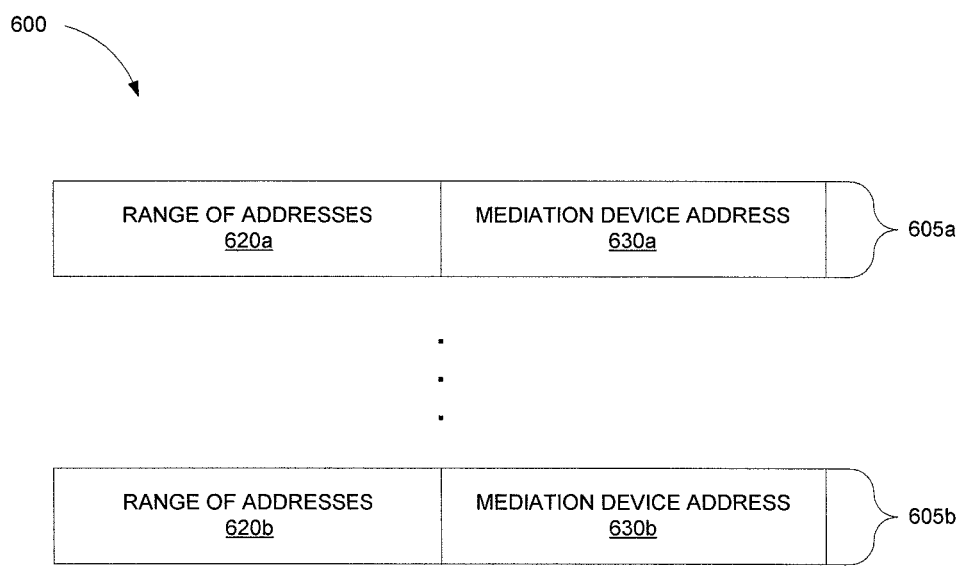
FIG. 6 is a block diagram of a mediation device DB that may be used with techniques described herein.

FIG. 6 is a block diagram of a mediation device DB 600 that may be used with techniques described herein. DB 600 is illustratively a table comprising one or more entries 605 wherein each entry 605 includes a range-of-addresses field 620 and a mediation device address field 630. The mediation device address field 630 holds information (e.g., an IP address) that represents an address associated with the mediation device 400 that may be used to address messages to the device 400. The information contained in DB 600 may be preconfigured by, for example, a user that has access to mediation device 400.

The range-of-addresses field 620 holds information that represents a range of addresses that are assigned to end nodes 110 that access the network 100 through an access device 200 that is within the control of the mediation device 400. For example, referring to FIG. 1, in an embodiment, access node 200a is within the control of mediation device 400a. An address (e.g., home address, care-of address) assigned to end node 110a which is connected to the network 100 via access node 200a would be represented in the range-of-address field 620 of an entry 605 associated with mediation device 400a.

It should be noted that functions performed by an access node 200 and/or a mediation device 400 including functions that implement aspects of techniques described herein, may be implemented in whole or in part using some combination of hardware and/or software. In addition, logic that performs functions associated with an access node 200 and/or a mediation device 400 may be encoded in one or more tangible computer-readable media for execution and, when executed, operable to perform aspects of techniques described herein. The logic may be, for example, software, hardware or some combination thereof. The computer readable media may be, for example, volatile memories, non-volatile memories, flash memories, removable disks, non-removable disks, logic circuitry, wireless signals, electrical signals carried over a wire, optical signals carried over optical fiber and so on.

As will be described further below, an end node 110 that receives a care-of address informs its home agent 200 of the care-of address to cause the home agent 200 to forward messages to the end node 110 using the end node's care-of address. The end node 110 may use a binding update message containing the care-of address to inform the home agent 200 of its care-of address. An example of a binding update message that may be used with techniques described herein is described in RFC 3775.

Figure 7:
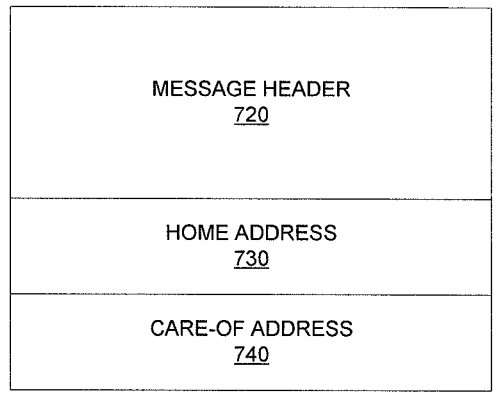
FIG. 7 is a block diagram of a notification message that may be used with techniques described herein.

In an embodiment, in response to receiving the binding update message, the home agent 200 illustratively generates and forwards a notification message containing the care-of address to its mediation device 400 to notify the mediation device 400 of the end node's care-of address. FIG. 7 is a block diagram of a notification message 700 that may be used with techniques described herein. Message 700 comprises a message header field 720, a home address field 730 and a care-of address field 740. The message header field 720 holds information that may be used to forward the message 700 in network 100. This information illustratively includes a destination address that is used to address the message 700 to the mediation device 400. Note that the header may contain other information, such as information that identifies the message as a notification message and a source address associated with the home agent 200. The home address 730 and care-of address 740 fields hold a home address and care-of address associated with the end node 110, respectively.

As will also be described further below, an end node 110 may be attached to the network 100 through an access node 200, which is not within the control of a mediation device 400 that is responsible for establishing a tap of the end node's communications. The access node 200, however, may be within the control of a second mediation device 400. In order to establish a tap of the communications, the first mediation device 400 may generate and forward a request message to the second mediation device 400 to cause the second mediation device 400 to direct the access node 200 to establish the tap.

Figure 8:
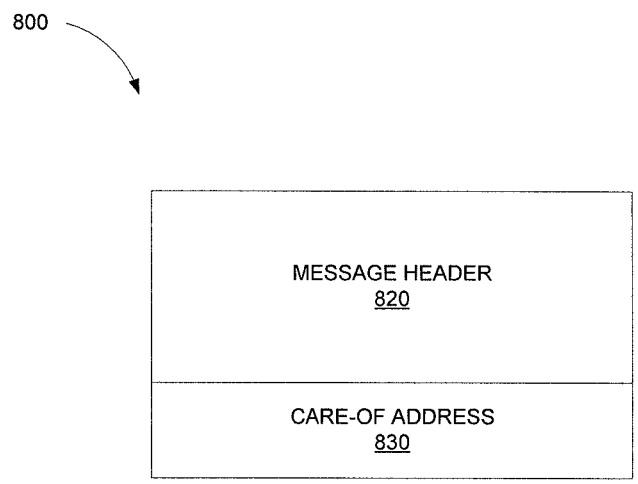
FIG. 8 is a block diagram of a request message that may be used with techniques described herein.

FIG. 8 is a block diagram of a request message 800 that may be used with techniques described herein. Message 800 comprises a message header field 820 and a care-of address field 830. The message header field 820 holds information that may be used to forward the message 800 via network 100 to the second mediation device 400. This information illustratively includes a destination address that is used to address the message 800 to the second mediation device 400. Note that the header may contain other information, such as information that identifies the message as a request message and a source address associated with the first mediation device 400. The care-of address field 830 holds a care-of address associated with the end node 110 whose communications are to be tapped.

Figure 9:
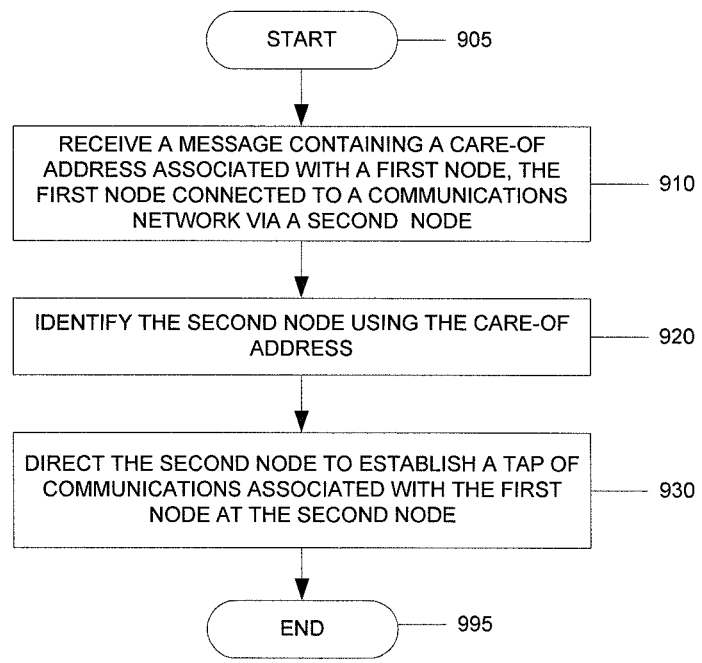
FIG. 9 is a flow chart of a sequence of steps that may be used to tap communications associated with a first node in a communications network at a second node in the communications network in accordance with an embodiment of techniques described herein.

FIG. 9 is a flow chart of a sequence of steps that may be used to tap communications associated with a first node (e.g., an end node 110) in a communications network at a second node (e.g., an access node 200) in the communications network in accordance with an embodiment of techniques described herein. The sequence begins at step 905 and proceeds to step 910 where a care-of address associated with the first node is received. The received care-of address may be contained in a received message that is sent from a particular entity. For example, the care-of address may be contained in a binding update message sent by the first node, a notification message sent by a home agent associated with the first node or a request message sent by a mediation node associated with the first node. At step 920, the second node is identified using the care-of address. As will be described further below, the second node may be identified from information contained in an access DB 500 at a mediation device 400 associated with the second node. At step 930, the second node is directed to establish a tap of communications associated with the first node at the second node. As will be described further below, in an embodiment of techniques described herein, a mediation device 400 may direct an access node 200 within the mediation device's control to establish the tap of communications by forwarding, e.g., a message containing a MIB which requests that the access node establish the tap. In another embodiment of techniques described herein, a first mediation device may request that a second mediation device direct an access node, that is not within the first mediation device's control, to establish the tap by forwarding a request message to the second mediation device to request that it direct the access node to establish the tap. The sequence ends at step 995.

Figure 10A:
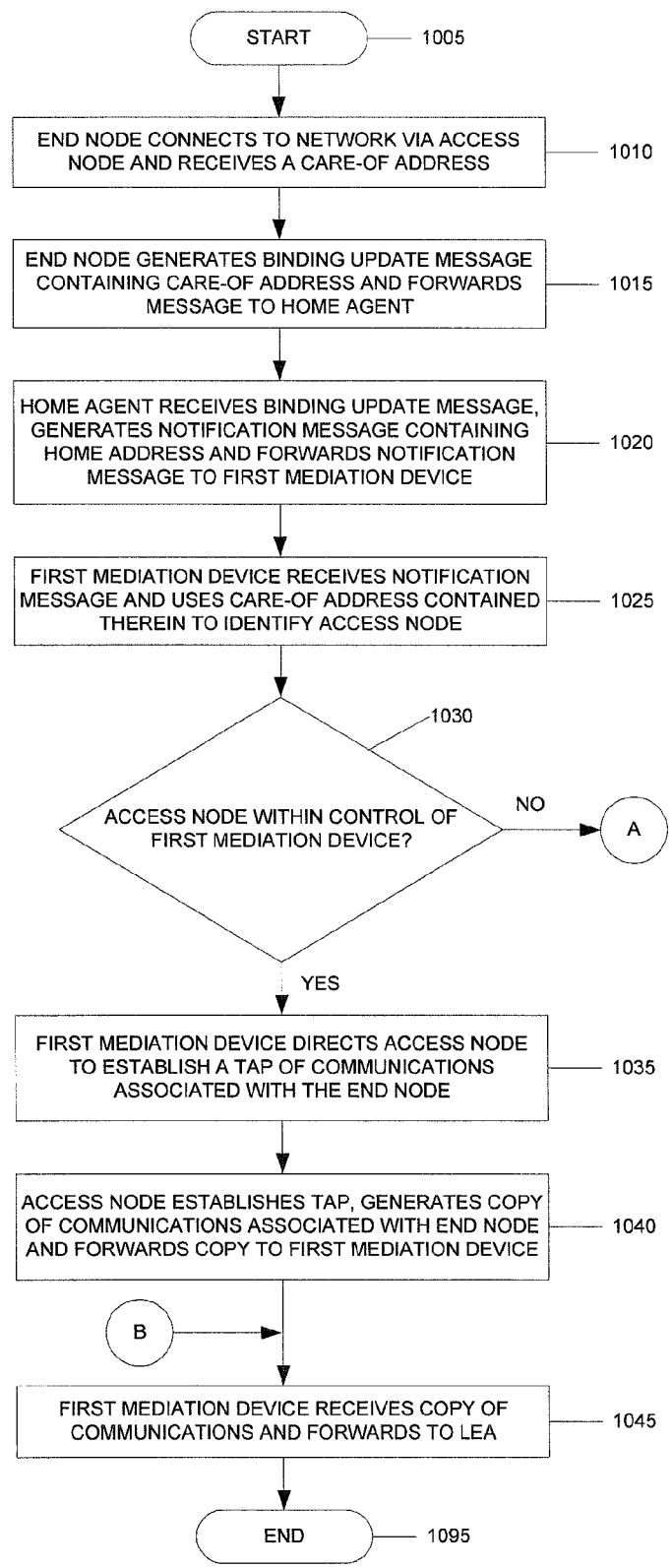
FIGS. 10A-B are a flow chart of a sequence of steps that may be used to tap communications associated with an end node in a communications network at an access node in the communications network in accordance with an embodiment of techniques described herein.
Figure 10B:
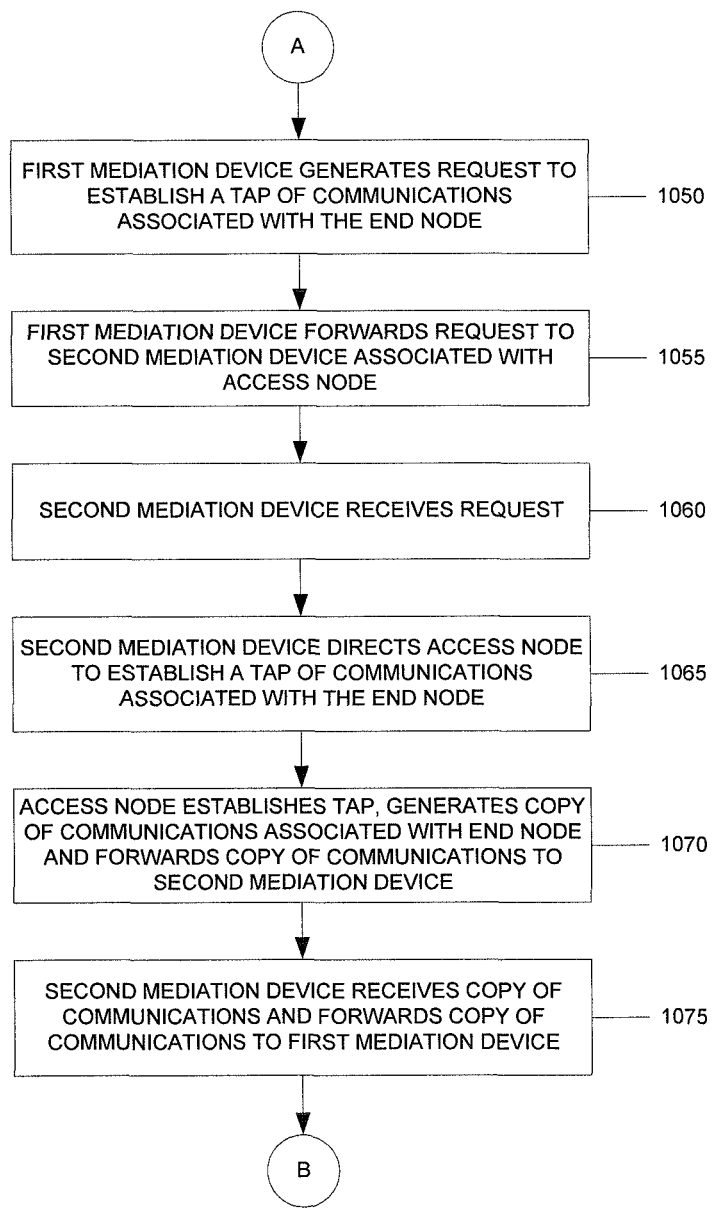

FIGS. 10A-B are a flow chart of a sequence of steps that may be used to tap communications associated with an end node 110 in communications network 100 at an access node 200 through which the end node 110 is connected to the network 100. The sequence begins at step 1005 and proceeds to step 1010 where the end node 110 connects to the communications network via the access node 200 and receives a care-of address. At step 1015, the end node 110 generates a binding update message containing the care-of address and forwards the binding update message to the end node's home agent 200. At step 1020, the end node's home agent 200 receives the binding update message, generates a notification message 700 containing the care-of address and forwards the notification message 700 via the network to a first mediation device 400 associated with the home agent 200. At step 1025, the first mediation device 400 receives (receives) the notification message 700 and uses the care-of address contained therein to identify an access node 200 through which the end node 110 is connected to the network 100.

At step 1030, the first mediation device 400 performs a check to determine if the identified access node 200 is within the control of the first mediation device 400. If at step 1030 it is determined that the access node 200 is in control of the first mediation device 400, the sequence proceeds to step 1035 where the first mediation device 400 directs the access node 200 to establish a tap of communications associated with the end node 110. As noted above, the access node 200 may be directed to establish the tap using MIB 434, as described above. The sequence then proceeds to step 1040 where the access node 200 establishes the tap, generates a copy of communications associated with the end node 110 and forwards the copy to the first mediation device 400. At step 1045, the first mediation device 400 receives the copy of communications associated with the end node 110 and forwards the copy to the LEA. The sequence ends at step 1095.

If at step 1030 the first mediation device 400 determines the identified access node 200 is not within control of the first mediation device 400, the sequence proceeds to step 1050 (FIG. 10B) where the first mediation device 400 generates a request to establish a tap of communications associated with the end node 110. The request may be in the form of request message 800, such as request message 800 that contains the care-of address associated with the end node 110 in the care-of address field 830. At step 1055, the first mediation device 400 forwards the request to a second mediation device 400 that may direct the access node 200 to establish the tap.

At step 1060, the second mediation device 400 receives the request and, in response to the request, at step 1065, directs the access device 200 to establish a tap of communications associated with the end node 110. The second mediation device 400 may direct the access node 200 to establish the tap by generating a message containing MIB 434 and forwarding the message to the access node 200, as described above. At step 1070, the access node 200 establishes the tap, generates a copy of communications associated with the end node 110 and forwards the copy of the communications to the second mediation device 400. The second mediation device 400 receives the copy of the communications, at step 1075, and forwards the copy to the first mediation device. The sequence then proceeds to step 1045.

For example, referring to FIGS. 1 and 10A-B, in an embodiment, access nodes 200a and 200b are within the control of mediation device 400a and access node 200c is within control of mediation device 400b and the home agent for node 110b is access node 200a. Now assume that communications associated with node 110b are to be tapped at access node 200b and a copy of the tapped communications is to be forwarded to the LEA node 170 via mediation device 400a.

End node 110b accesses the network 100 via access node 200b and receives a care-of address (step 1010). End node 110b generates a binding update message containing the care-of address and forwards the binding update message to its home agent, i.e., access node 200a (step 1015). Access node 200a receives the binding update message and processes it including generating an entry 305 in bindings cache 300 for node 110b and placing the home address associated with end node 110b in the home address field 320 of the entry 305 and the care-of address associated with end node 110b in the care-of address field 330 of the entry 305 to establish an association between the end node's home address and care-of address. In addition, access node 200a generates a notification message 700 containing the home address in the home address field 730 and the care-of address in the care-of address field 740, initializes the header field 720 to specify mediation device 400a as the destination for the message 700 and forwards the notification message 700 to mediation device 400a (step 1020).

Mediation device 400a receives the notification message 700 and uses the care-of address contained therein to identify access node 200b (step 1025). The mediation device 400a may identify access node 200b by comparing the care-of address to the range-of-address information contained in entries 505 in its access node database 500 to locate an entry 505 where the care-of address falls with entry's range of addresses 520. Assume that a matching entry 505 is found that identifies access node 200b.

Since a matching entry 505 was found, mediation device 400a concludes that the access node 200b is within the mediation device's control (step 1030) and proceeds to direct access node 200b to establish a tap of communications associated with end node 110b (step 1035), as described above. Access node 200b establishes the tap, generates a copy of all communications associated with end node 110b and forwards the copy to mediation device 400a (step 1040). Mediation device 400a receives the copy of the communications and forwards the copy to LEA node 170 (step 1045).

Again, referring to FIGS. 1 and 10A-B, in another embodiment, the home agent for node 110c is access node 200a and communications associated with node 110c are to be tapped at access node 200c. Node 110c connects to the network 100 via access node 200c and receives a care-of address (step 1010). Node 110c generates a binding update message containing the care-of address and forwards the message to its home agent (i.e., access node 200a), as described above (step 1015). The message travels via network 100 to access node 200a which receives the message and processes it. As noted above, this processing may include updating its bindings cache 300, as described above. In addition, access node 200a generates a notification message 700 containing the home address and forwards the notification message 700 to mediation device 400a, as described above (step 1020).

Mediation device 400a receives the notification message 700 (step 1025) and uses the care-of address contained therein to determine if access node 200c is within the control of mediation device 400a, as described above (step 1030). Since, as noted above, access node 200c is not within the control of mediation device 400a, mediation device 400a searches its mediation device DB 600 to identify a mediation device that can direct access node 200c to establish the tap. Specifically, mediation device 400a searches its DB 600 for an entry 605 that contains a range of addresses 620 that includes the care-of address associated with end node 110c. Assume a matching entry 605 is found and that the mediation device address field 630 contained in the matching entry 605 includes an address for mediation device 400b.

Mediation device 400a generates a request message 800 including initializing the message's header 820 to specify mediation device 400b as a destination for the message 800, and placing the care-of address associated with end node 110c in the message's care-of address field 830 (step 1050). Mediation device 400a then forwards the request message 800 to mediation device 400b (step 1055).

The request message 800 is received by mediation device 400b (step 1060) and, in response to the message 800, mediation device 400b directs access node 200c to establish a tap of communications associated with end node 110c, as described above (step 1065). Access node 200c establishes the tap, generates a copy of communications to and from end node 110c and forwards the copy of the communications to mediation device 400b (step 1070). Mediation device 400b receives the copy of communications and forwards it to mediation device 400a (step 1075). Mediation device 400a receives the copy of communications and forwards it to the LEA node 170 (step 1045).

Once again, referring to FIGS. 1 and 10A-B, in yet another embodiment, a mediation device 400 receives a care-of address associated with an end node 110 from an update message sent by the end node rather than from a notification message. Here, the mediation device 400 directs the end node's home agent 200 to tap communications associated with the end node 110. The end node 110 receives its care-of address, generates the binding update message containing the care-of address and forwards the binding update message to the home agent 200. The home agent 200 receives the binding update message and, since the tap is established at the home agent 200, automatically generates a copy of the binding update message and forwards the copy to the mediation device 400. The mediation device 400 receives the copy of the binding update message and receives the care-of address by extracting it from the message.

While techniques described herein have been particularly shown and described with reference to particular embodiments, it will be understood by those skilled in the art that various changes in form and details may be made therein without departing from the scope and spirit of the invention encompassed by the appended claims. As such, the foregoing described embodiments are not intended to be limiting.

What is claimed is:

1. A method comprising:
    receiving, with a third node, a first message containing a care-of-address associated with a first node in a communications network, the first node connected to the communications network via a second node in the communications network;
    accessing, with the third node, a database to identify the second node using the care-of address;
    directing, with the third node, the second node to establish a tap of communications associated with the first node at the second node when the third node identifies the second node in the database; and
    sending, with the third node, a request message to a fourth node, the request message comprising a request to the fourth node to direct the second node to establish the tap of communications when the third node does not identify the second node in the database,
    wherein the tap of communications comprises reproduction by the second node of the communications associated with the first node.

2. A method as defined in claim 1 wherein the first node is an end node.

3. A method as defined in claim 1 wherein the second node is an access node.

4. A method as defined in claim 1 wherein the first message is sent by the first node.

5. A method as defined in claim 4 wherein the first message is a binding update message.

6. A method as defined in claim 1 wherein the first message is a notification message that is sent by a home agent associated with the first node.

7. A method as defined in claim 1 further comprising:
    comparing, with the third node, the care-of-address with a range of addresses associated with the second node in the database to determine if the care-of-address falls within the range of addresses.

8. A method as defined in claim 7 wherein the range of addresses is contained in an entry, contained in a data structure, that is associated with the second node.

9. A method as defined in claim 1 wherein directing further comprises:
    generating, with the third node, a second message to tap communications associated with the first node at the second node; and
    forwarding, with the third node, the second message to the second node to cause the second node to establish a tap of communications associated with the first node at the second node.

10. A method as defined in claim 1 wherein the second message contains a Management Information Base (MIB) configured to direct the second node to establish the tap.

11. A method as defined in claim 1 wherein the request message contains the care-of address.

12. The method as defined in claim 1, further comprising:
    determining, with the third node, that the second node is within control of the third node when the third node identifies the second node in the database; and
    determining, with the third node, that the second node is not within control of the second node when the third node does not identify the second node in the database,
    wherein directing the second node to establish the tap of communications comprises directing, with the third node, the second node to establish the tap of communications in response to determining that the second node is within control of the third node, and
    wherein sending the request message to the fourth node comprises sending, with the third node, the request message to the fourth node in response to determining that the second node is not within control of the third node.

13. The method as defined in claim 1, wherein the first node comprises an end node, the second node comprises an access node, the third node comprises a first mediation node, and the fourth node comprises a second mediation node.

14. An apparatus comprising:
    a network interface configured to receive a first message containing a care-of address associated with a first node in a communications network, the first node connected to the communications network via a second node in the communications network; and
    a processor configured to:
        access a database to identify the second node using the care-of address;
        direct the second node to establish a tap of communications associated with the first node at the second node in response to identification of the second node in the database by the processor; and
        send a request message to a different apparatus to request that the different apparatus direct the second node to establish the tap of communications in response to no identification of the second node in the database by the processor,
    wherein the tap of communications comprises reproduction by the second node of the communications associated with the first node.

15. An apparatus as defined in claim 14 wherein the first message is sent by the first node.

16. An apparatus as defined in claim 15 wherein the first message is a binding update message.

17. An apparatus as defined in claim 14 wherein the first message is a notification message that is sent by a home agent associated with the first node.

18. An apparatus as defined in claim 14 wherein the processor is further configured to:
    generate a second message to direct the tap of communications associated with the first node at the second node, and
    forward the second message to the second node to cause the second node to establish the tap of communications associated with the first node at the second node.

19. An apparatus as defined in claim 14 wherein the second message contains a Management Information Base (MIB) configured to direct the second node to establish the tap.

20. The apparatus of claim 14, wherein the processor is further configured to:
    determine that the second node is within the control of the apparatus to direct the tap of communications in response to identification of the second node in the database; and determine that the second node is not within the control of the apparatus to direct the tap of communications in response to no identification of the second node in the database.

21. The apparatus as defined in claim 14, wherein the apparatus comprises a first mediation device, the first node comprises an end node, the second node comprises an access node, and the fourth node comprises a second mediation device.

* * * * *